(12) United States Patent
Powell et al.

(10) Patent No.: US 8,995,507 B2
(45) Date of Patent: Mar. 31, 2015

(54) TRANSCEIVER SELF-DIAGNOSTICS FOR ELECTROMAGNETIC INTERFERENCE (EMI) DEGRADATION IN BALANCED CHANNELS

(75) Inventors: Scott R. Powell, Aliso Viejo, CA (US); Mehmet V. Tazebay, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 665 days.

(21) Appl. No.: 13/218,594

(22) Filed: Aug. 26, 2011

(65) Prior Publication Data

US 2012/0314794 A1 Dec. 13, 2012

Related U.S. Application Data

(60) Provisional application No. 61/494,325, filed on Jun. 7, 2011.

(51) Int. Cl.
*H04B 1/38* (2006.01)
*H04B 3/00* (2006.01)
(Continued)

(52) U.S. Cl.
CPC ...... *H04L 25/03885* (2013.01); *H04L 25/0274* (2013.01)
USPC ........... 375/220; 375/219; 375/257; 375/295; 375/316

(58) Field of Classification Search
USPC ................. 375/258, 257, 295, 316, 224, 227, 375/E7.002, E7.279, E7.003, 219, 220, 375/222, 240.26–240.27, 285, 346, 349, 375/352, 214, 211; 324/98, 110, 114, 126, 324/130, 144, 75, 200, 260, 262, 263; 714/746, 799, 1
See application file for complete search history.

(56) References Cited

U.S. PATENT DOCUMENTS

2008/0062600 A1* 3/2008 Crawley et al. ................. 361/56
2008/0084218 A1* 4/2008 Hailey et al. .................. 324/627
(Continued)

FOREIGN PATENT DOCUMENTS

TW 201032391 A 9/2010
WO 2010094595 A1 8/2010

OTHER PUBLICATIONS

European Search Report; EP Application No. 12001548.2; Aug. 1, 2012; 3 pgs.
(Continued)

*Primary Examiner* — Sam K Ahn
*Assistant Examiner* — Linda Wong
(74) *Attorney, Agent, or Firm* — Garlick & Markison; Shayne X. Short

(57) ABSTRACT

Transceiver self-diagnostics for electromagnetic interference (EMI) degradation in balanced channels. Selective operation of transmitting a common mode signal from a communication link implemented for supporting differential signaling, and appropriate processing of any detected signal energy, such as that corresponding to differential signal energy, provides a measure of electromagnetic compatibility (EMC) corresponding to the communication link. Comparison of detected differential signal energy to one or more thresholds may provide indication of whether or not the communication link is balanced or unbalanced, a degree or margin with which the communication link is compliant in accordance with EMC in accordance with one or more protocols, standards, or recommended practices. Multiple successive measurements of detected differential signal energy may be used to determine a trend of performance, such as whether or not the communication link is trending toward imbalance, failure, or noncompliance.

20 Claims, 5 Drawing Sheets

(51) Int. Cl.
*H04L 25/03* (2006.01)
*H04L 25/02* (2006.01)

(56) References Cited

U.S. PATENT DOCUMENTS

| | | |
|---|---|---|
| 2009/0079522 A1* | 3/2009 | Liang et al. ............... 333/24 R |
| 2010/0267283 A1* | 10/2010 | Pischl ..................... 439/620.05 |
| 2011/0038381 A1 | 2/2011 | Oren et al. |
| 2011/0217009 A1* | 9/2011 | Burrell et al. ................ 385/92 |
| 2011/0268258 A1* | 11/2011 | Alloin et al. ............... 379/32.04 |
| 2011/0292977 A1* | 12/2011 | Farjadrad ..................... 375/220 |
| 2011/0296267 A1* | 12/2011 | Malkin et al. ................ 714/746 |

OTHER PUBLICATIONS

IEEE Standard for Local and metropolitan area networks; Virtual Bridged Local Area Networks, Amendment 14: Stream Reservation Protocol (SRP); IEEE Std. 802.1Qat-2010, (Amendment to IEEE Std 802.1Q-2005), Sep. 30, 2010, 118 pgs.

* cited by examiner

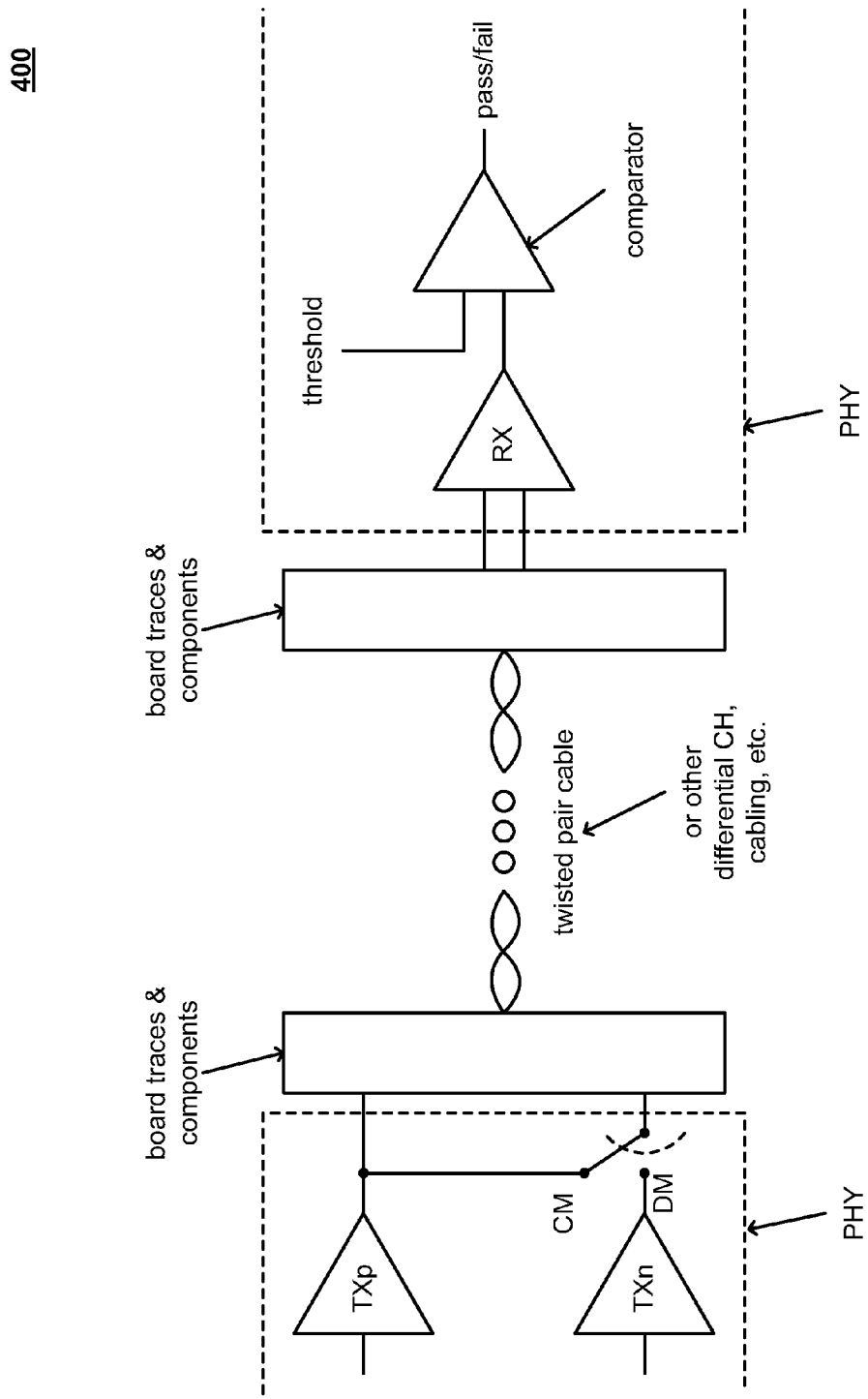

TRANSCEIVER SELF-DIAGNOSTICS FOR ELECTROMAGNETIC INTERFERENCE (EMI) DEGRADATION IN BALANCED CHANNELS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/494,325, entitled "Transceiver self-diagnostics for electromagnetic interference (EMI) degradation in balanced channels," filed Jun. 7, 2011.

BACKGROUND OF THE INVENTION

1. Technical Field of the Invention

The invention relates generally to communication systems; and, more particularly, it relates to identifying and character.

2. Description of Related Art

Data communication systems have been under continual development for many years. Within different types of communication systems, different respective communication channels may be implemented using different types of media. For example, certain communication channels are implemented in accordance with differential signaling. As such, such communication channels can include two respective and typically parallel paths constitute the media by which signals are communicated from a first communication device to a second indication device connected via the communication channel.

Unfortunately, in many actual implementations of communication channels, particularly those implemented via wired cabling, problems may occur with respect to the actual wiring. For example, insulation of such cabling may degrade, pressure points and/or twists along the cabling may cause problems, etc. Various examples of such problems within wired cabling may include opens, shorts, mis-terminations, etc. In some instances, even though there may be significant degradation to the particular cabling of a given installation, the signal processing (e.g., including error detection and/or correction, modulation schemes, etc.) may be such that data communications effectuated over a given compromised communication link will nonetheless occur without any problems. As such, because there is no discernible degradation in data communication quality and or error rates, it may be difficult to determine whether or not the cabling has any problems.

However, certain applications operate within certain constraints such that that electromagnetic interference effects should be nonexistent or below some acceptable level. For example, a cabling having such degradation may unfortunately emit undesirable electromagnetic interference that will deleteriously affect the operation of other devices within a system and/or subsystem corresponding to such cabling. Also, a cabling having such degradation may unfortunately be susceptible to electromagnetic interference from one or more other sources. Generally speaking, there continues to be a need in the art for effective identification and characterization of such problems as may occur within various communication systems.

BRIEF DESCRIPTION OF THE SEVERAL VIEWS OF THE DRAWINGS

FIG. 4 illustrates an alternative embodiment of communication system operating in accordance with differential signaling in which diagnostics of electromagnetic interference may be made.

DETAILED DESCRIPTION OF THE INVENTION

Figure 1:
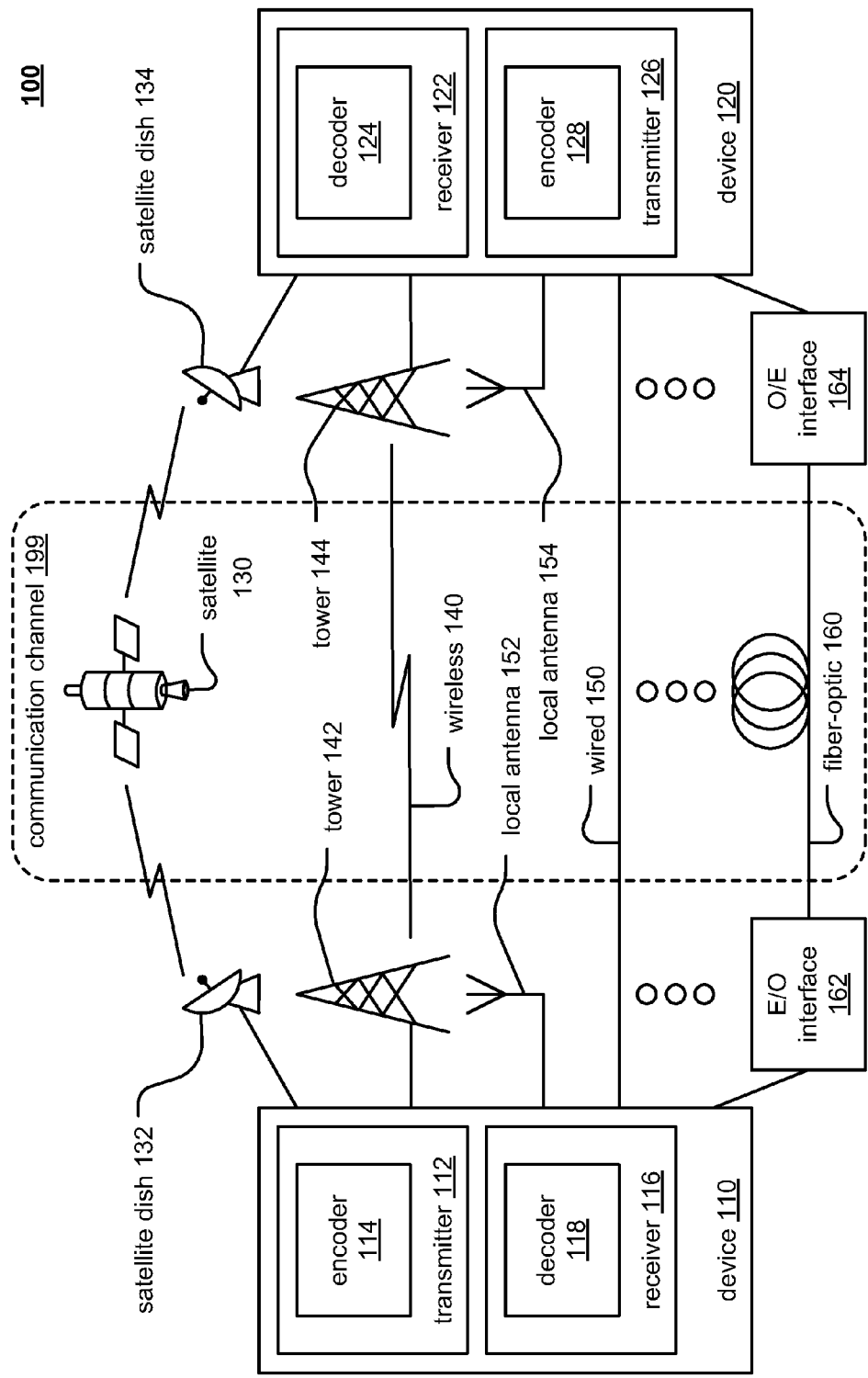
FIG. 1 and FIG. 2 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
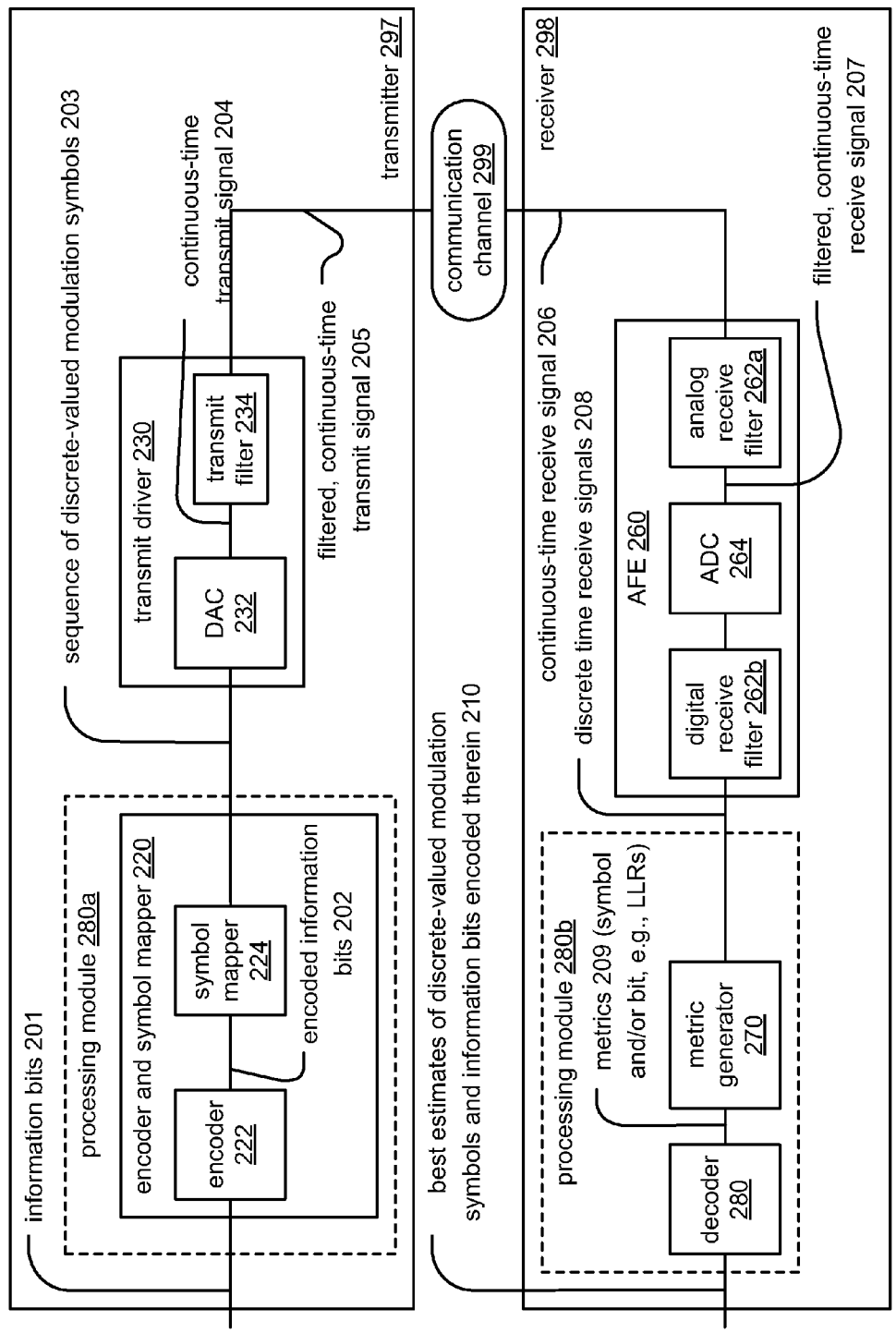

FIG. 1 and FIG. 2 illustrate various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction, noise cancellation, equalization, and channel coding schemes are often employed. Generally, these error correction, noise cancellation, equalization, and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which data (e.g., information data, video data, audio data, etc. and/or generally any type of data) is communicated from one location, or subsystem, to another, data encoding may generally be viewed as being performed at a transmitting end of the communication channel 199, and data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only data encoding capability, and the communication device 120 may include only data decoding capability, or vice versa (e.g., in a uni-directional communication embodiment such as in accordance with a broadcast embodiment).

Referring to the communication system 200 of FIG. 2, at a transmitting end of a communication channel 299, information bits 201 (e.g., corresponding particularly to data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes an analog receive filter 262a (that generates a filtered, continuous-time receive signal 207), an ADC (Analog to Digital Converter) 264 (that generates discrete-time receive signals 208), and a digital receive filter 262b (that generates a filtered and/or equalized signal with possible noise cancellation). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of data is communicated from one location, or subsystem, to another (e.g., from transmitter 297 to the receiver 298 via the communication channel 299).

It is noted that, while the previous diagrams and embodiments may generally be applied to a number of different types of communication systems, in a preferred embodiment, various aspects, and their equivalents, of the invention may be directed towards those having at least one communication link therein that is implemented via wired media. For example, certain communication systems may include a combination of multiple types of communication links (e.g., some wireless, some wired, some microwave, some fiber-optic, etc. and/or any combination thereof, etc.). However, even within communication systems that are not fully implemented using wired communication media for the respective communication links therein, a very large majority of communication systems do in fact include at least some communication links therein that are implemented via wired media. For example, even in accordance with wireless communication systems, certain of the wireless transceivers often times have some wired interconnections with one or more other devices.

As mentioned elsewhere herein, certain applications require that the respective electronic components and/or communication links within a communication system need to comply with appropriate emissions and noise immunity requirements. Different applications may have different requirements. For example, in addition to complying with certain data transmission error rate requirements within a given application, such electronic components and/or communication links may also need to comply with appropriate emissions and or noise immunity requirements for compliance in accordance with one or more protocols, standards, and or recommended practices. In certain instances, a communication link operating in accordance with an acceptable signal-to-noise ratio (SNR) does not necessarily provide any measure of electromagnetic compatibility (EMC) (e.g., as operating in accordance with appropriate emission and/or noise immunity requirements, which may be different for different applications). That is to say, even though a communication link operates in accordance with one or more constraints within an acceptable level of performance, such a communication link may nonetheless be noncompliant with respect to EMC. For example, a communication link having an acceptable SNR and/or a lack of any faults there along does not necessarily provide any measure of compliance in accordance with EMC (emissions, immunity, etc.). While a relatively poor performance with respect to EMC may not necessarily degrade data transmissions to appoint at which they are problematic and/or detectable, a given communication link may nonetheless be degraded to the point that it does operate with an unintentional violation of emissions/immunity requirements.

For example, within one embodiment operative in accordance with Ethernet related applications, twisted-pair connections between different respective communication devices may be made, such as via a common RJ-45 (or other connection means) interface. In accordance with such Ethernet related applications, signaling is often implemented in accordance with a full-duplex operation over a twisted-pair cable. As also mentioned elsewhere herein, even when such a communication link is degraded to some extent in terms of EMC, data related communications via such a communication links may nonetheless operate within an acceptable manner. That is to say, the error rates of such a degraded communication link may be acceptable for a given application, and as such, there may be no directly or easily detectable indication that there is a problem with the communication link.

However, such a communication link may unfortunately still be degraded to the point that it is emitting electromagnetic interference that may affect one or more other devices, component, communication links, etc. and/or being susceptible to/incurring electromagnetic interference from one or more other devices, component, communication links, etc.

In accordance with certain communication links and applications, EMC performance (e.g., the susceptibility and/or immunity issues associated with electromagnetic interference) may be strongly affected in locales and/or circuitries in which differential mode (DM) to common mode (CM) signal conversion, or vice versa, is operative to be performed. For example, certain signaling within a communication system may be implemented in accordance with differential signaling, while other signaling within that same communication system may be implemented in accordance with common mode signaling. At various points within a given system, conversion between differential signaling and single ended signaling and/or common mode signaling can typically occur. In certain situations, the conversion from differential to common mode signaling occurs at or near the interfaces and/or connecting hardware between respective types of communication channel and/or communication link media within a system. For example, a given application may include communication links implemented using different types of communication media such as cabling, connectors, board traces such as in accordance with a printed circuit board (PCB), bond wires, jumpers, etc. and/or the respective interfaces between any different communication media types.

Typically, means by which EMC performance in regards to the differential to common mode conversion is evaluated are performed off-line such that one or more connecting/testing hardware is implemented by skilled technicians with sufficient test equipment. For example, a given component (e.g., PCB, circuit, cable, etc.) is taken out of its application environment and taken into a laboratory which a skilled technician can assess the operation thereof using clamps, sophisticated diagnostic devices and test equipment, etc. In certain situations, very sophisticated test equipment is required to measure the differential to common mode conversion associated with a given component and to characterize the EMC performance thereof. Some examples of such sophisticated test equipment include multiport network analyzers, special electromagnetic interference (EMI) generation equipment, anechoic, chambers, etc. As may be understood, when such testing and diagnosis is inherently performed in such a controlled environment, the given component being analyzed must be brought into such a controlled testing environment, and is therefore currently no longer in use within its intended application.

Alternatively, such a skilled technician may go into the field (e.g., the environment in which a given component is implemented) accompanied with the appropriate clamps, diagnostic devices and test equipment, etc. that are employed to assess the EMC performance of that given component.

Herein, a novel approach is presented by which diagnostics of such component may be implemented and performed without removing such a component from its particular application. In a preferred embodiment, such diagnostics functionality is implemented within the physical layer (PHY) of a given communication device. That is to say, the physical layer of a given communication device corresponds to that which directly drives a given signal via a communication link. For example, the physical layer of the communication device may be viewed as that layer which provides a continuous-time signal/an analog signal that is launched into a communication channel for transmission to at least one other communication device. At the other end of the communication channel, a receiving communication device also includes a physical layer to perform receipt, processing, etc. of that continuous-time/analog signal.

In accordance with in accordance with various aspects, and their equivalents, of the invention, a novel diagnostics feature may be included within a PHY transceiver device operating in accordance with differential signaling. For example, such a PHY transceiver device may be implemented within an application including communications over (ideally) balanced channels. Such a PHY transceiver device is implemented to include the capability and/or functionality to detect physical faults (e.g., opens, shorts, mis-terminations, etc) in a differential signaling communication link (e.g., twisted-pair cabling and connecting hardware in accordance with such cable diagnostics).

Also, various aspects of such a PHY transceiver device may include the ability to assess, characterize, and/or report signal to noise ratio (SNR) and/or mean-square error (MSE) as a metric of operating margin. For example, in certain situations, a relatively good SNR combined with the absence of cable faults may generally result in establishment of a successful data link with an acceptably low error rate between two respective PHY transceivers.

However, as also mentioned elsewhere herein in addition to complying with data transmission error rate requirements (e.g., that may vary from one application to another), the respective electronics and/or component within a given application may also need to comply with appropriate emissions and/or noise immunity requirements (e.g., that may vary from one application to another).

That is to say, as also mentioned elsewhere herein, a sufficiently acceptable SNR and a lack of cable faults does not necessarily provide any measure of EMC integrity (emissions/immunity), and relatively poor EMC performance may not degrade data transmission performance to the point that it is detectable and/or problematic, and it may (and can) go unnoticed resulting in unintentional violation of emissions/immunity requirements. As may be understood, even though a given communication link may be operating in accordance with an acceptably low error rate, with a sufficiently acceptable SNR, lack of cable faults, etc., that communication link may nonetheless be deleteriously affecting the operation of one or more other component within the system.

Generally speaking, the differential to common mode (DM to CM) conversion process may be viewed primarily a linear function reciprocal to the common mode to differential (CM to DM) conversion process. Therefore, the reverse conversion process from common mode to differential (CM to DM) conversion may also be employed as a measure of the differential to common mode (DM to CM) conversion process. Herein, a novel approach is presented by which a measure of the common mode to differential (CM to DM) conversion is employed also as a measure of the differential to common mode (DM to CM) conversion process.

For example, at least one metric that may be identified for the common mode to differential (CM to DM) conversion is determined by driving one end of the given communication link (e.g., one end of a differentially signaled cable) with a common mode signal and monitoring and/or detecting differential signal energy at the other end of the communication link. In an alternative embodiment, at least one metric that may be identified for the common mode to differential (CM to DM) conversion is determined by driving one end of the given communication link (e.g., one end of a differentially signaled cable) with a differential signal and monitoring and/or detecting common mode signal energy received at the other end of the communication link.

In a perfectly balanced communication link, there should be absolutely no differential signal energy received at the other end of the communication link (e.g., the other end of a differentially signaled cable). However, if the communication link is not perfectly balanced, there will be some detected differential signal energy at that other end of the communication link due to the CM to DM conversion process.

In accordance with identifying any possible degradation within a given communication link, when a common mode signal is driven at one end of the communication link, detection of any received differential signal energy at the other end of the communication link may be employed as at least one metric to identify, assess, characterize, etc. the EMC performance of that given communication link. For example, a relatively high amount of received differential signal energy at the other end of the communication link may correspond to a strong amount of common mode to differential mode conversion in the given communication link. Again, as also mentioned elsewhere herein, a relatively high common mode to differential mode conversion may be employed as at least one metric (e.g., a direct indicator) of degradation with respect to EMC performance (e.g., degraded emissions and/or immunity performance).

Figure 3:
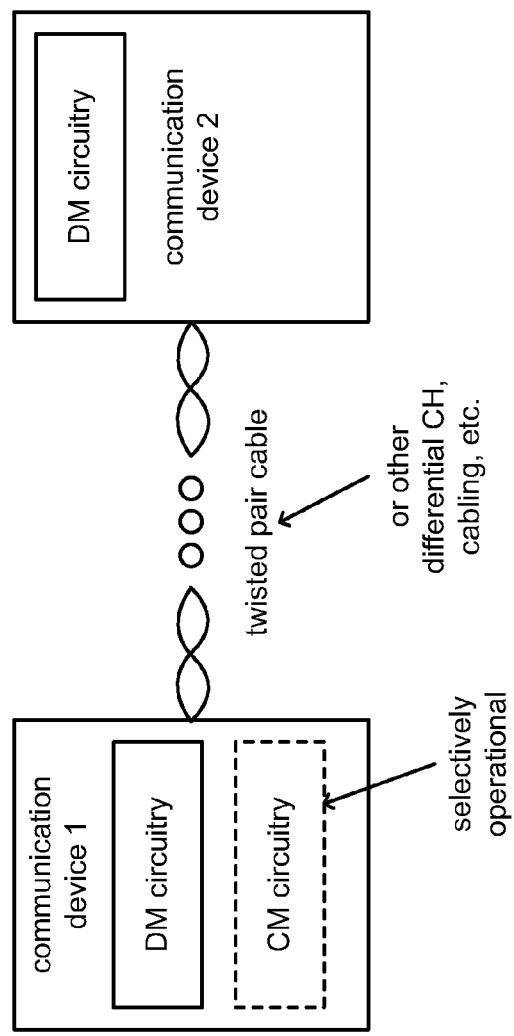
FIG. 3 illustrates an embodiment of a communication system operating in accordance with differential signaling in which diagnostics of electromagnetic interference may be made.

FIG. 3 illustrates an embodiment of a communication system 300 operating in accordance with differential signaling in which diagnostics of electromagnetic interference may be made. Generally speaking, the communication system may be viewed as including a first communication device located at one end of the communication channel and a second communication device located at the other end of the communication channel. Communications in accordance with such an application may be unidirectional, bidirectional, etc., and may comprise a single or multiple twisted pair cable.

For communication between the respective communication devices in accordance with differential signaling, a communication channel operative to support such signaling is implemented. For example such a communication link may be a twisted pair cable and/or any other communication link operative to effectuate differential signaling between respective communication devices. Each of the respective communication devices include differential mode circuitry for effectuating such differential signaling there between. In certain situations, one or both of the respective communication devices may also include the appropriate circuitry to effectuate a conversion between differential signaling and common mode signaling.

At least one of the respective communication devices also includes common mode circuitry therein that is at least selectively operational for driving common mode signaling via the communication link. In certain embodiments, only one of the communication devices includes such common mode circuitry therein. A given communication device that is operative in accordance with differential signaling will already include the appropriate receiver based circuitry to detect differential signal energy via the communication link. As such, for the appropriate characterization of a given communication link, only one of the communication devices at each respective end thereof need includes such common mode circuitry for driving of a common mode signal via the communication link operative to support differential signaling.

While a majority of the communication between respective communication devices will be in accordance with differential signaling such as employing the differential mode circuitry within those respective communication devices, while operating a EMC performance testing (e.g., emissions and/or immunity testing), common mode circuitry within at least one of the communication devices is operational. That is to say, when operating in accordance with a testing mode, such as for performing EMC performance testing, the differential mode circuitry within one of the communication devices may be disabled such that differential signaling is not launched into the communication link thereby. During that testing mode, the common mode circuitry is then operable to launch a common mode signal via the communication link operative to support differential signaling.

As can be seen, relatively little modification of a given communication device is made to provide for such EMC performance testing. In certain embodiments, each respective communication device may of course include the appropriate common mode circuitry therein for supporting such EMC performance testing functionality. In such embodiments in which multiple communication devices, such as at least two communication devices located at opposite ends of a given communication link, EMC performance testing may be effectuated in both directions of the communication link. That is to say, at one time a first communication device may drive a common mode signal into the communication link towards the second communication device, and the second communication device detects any differential signal energy there from. At another time, a second communication device may drive a common mode signal into the communication link towards the first communication device, and the first communication device detects any differential signal energy there from. In such embodiments, EMC performance testing in both directions may be performed.

In certain applications, such as volume manufacturing, it may be difficult and/or impractical to perform detailed EMC performance testing (e.g., emissions and/or immunity testing), particularly when using such means that include relatively sophisticated test equipment, skilled technicians, etc.

In one embodiment herein, at least one potential application of various aspects, and their equivalents, of the invention may be particularly tailored as a manufacturing test that may be performed at initial deployment or after repairs have been made to a particular component. For example, as described with respect to certain embodiments, such EMC performance diagnostics functionality may be included within a given communication device (e.g., including such common mode circuitry particularly within a given PHY transceiver), and selective operation in accordance with such an EMC performance diagnostics test operational mode may be included within a PHY transceiver device.

With respect to this diagram as well as with respect to other embodiments and/or diagrams herein, it is noted that while various applications are directed towards driving a common mode signal into one end of the communication link and detecting differential signal energy at the other end of the communication link, the reader will understand that the reciprocal operation may alternatively be performed (e.g., borrowing on the inherently reciprocal nature of CM-DM conversion with respect to DM-CM conversion). For example, certain applications may be directed towards driving a differential signal (e.g., sometimes a relatively large differential signal) into one end of the communication link and detecting common mode signal energy at the other end the communication link. Either or both of these reciprocal and correlative applications may be performed in various embodiments as desired.

FIG. 4 illustrates an alternative embodiment 400 of communication system operating in accordance with differential signaling in which diagnostics of electromagnetic interference may be made. As may be seen with respect to this diagram, the PHYs at each end of a communication link are operative to support communications in accordance with differential signaling. For example, the PHY at the left-hand side of the diagram includes two respective communication paths for effectuating differential signaling there from. Also, the PHY at the right-hand side of the diagram includes appropriate receiver functionality for effectuating differential signaling. It is noted that while this particular diagram corresponds to unidirectional communications from the left-hand side of the diagram to the right hand side of the diagram, other embodiments may of course include bidirectional communications such that communications may be effectuated in both directions of the communication link (e.g., each of the respective PHYs may include both transmitter and receiver capability and/or functionality therein).

Referring to FIG. 4, one end of the communication link may be configured to transmit a common mode signal while the other end of the communication link can be configured to measure any received differential signal energy. Such functionality of transmitting a common mode signal via the communication link may be selectable. That is to say, such functionality may be operable only when desired. For example, while a majority of the operation of communications via the communication link are effectuated in accordance with differential signaling, selective operation of driving a common mode signal may be performed when the desired (e.g., periodically, when specifically instructed, in response to one or more events, etc.) to facilitate EMC performance diagnostics testing. Although various aspects, and their equivalents, of the invention do not preclude simultaneous transmission of CM and DM signals, generally speaking, when a common mode signal is driven into the communication link, a differential mode signal will not be, and vice versa.

For example, in an embodiment includes both differential mode circuitry and common mode circuitry within a given communication device located at a respective and the communication link, when the differential mode circuitry is driving a differential signal into that respective end of the communication link, the common mode circuitry will not be driving a common mode signal into that respective end of the communication link. Such operation may be effectuated in a variety of ways, including disabling the common mode circuitry, powering down the, mode circuitry, bypassing or disconnecting a transmission path from the common mode circuitry to the communication link, etc. Also, when the common mode circuitry is driving a common mode signal into that respective end of the communication link, the differential mode circuitry will not be driving a differential signal into that respective end the communication link.

In a perfectly balanced communication link, the received signal energy at the right-hand side of the communication link will be negligible (e.g., ideally zero, or relatively small or acceptable within a given constraint). However, if the received differential signal energy is not negligible, then an electromagnetic interference (EMI) "fault" may be identified. Such an EMI fault may be reported in an internal register of at least one of the communication devices corresponding to the communication link or indicated on a pin (e.g., via signaling provided by that pin) of the communication device.

Any of a variety of issues may cause such an EMI fault. For example, this could be caused by an unbalanced connector, untwisted portions of a twisted pair cable, unbalanced board traces such as on a PCB, etc.

As may be understood, given that such functionality is included within at least one of the respective PHYs, this EMC performance diagnostic testing may be performed after the communication link has been installed within its particular physical location/application without any need for specialized equipment, skilled technicians, EMI chambers, etc. Such functionality and/or operations in accordance with in accordance with various aspects, and their equivalents, of the invention may be broadly applied to any communication system in which differential signaling is performed. Particularly, those communication systems in which conversion between differential mode signaling and common mode signaling occurs, and/or the reverse conversion process, may benefit from such capability. Such an EMC performance diagnostic testing approach may be particularly attractive for those applications having relatively strict EMC performance requirements (e.g., strict emissions/immunity requirements such as in accordance with automotive applications). Also, certain applications in which it is quite difficult to perform testing using such specialized equipment, skilled technicians, etc. may benefit greatly from such capability.

Again, as also stated elsewhere herein, certain applications may alternatively be directed towards driving a differential signal into one end of the communication link and detecting common mode signal energy at the other end the communication link (e.g., as opposed to or in conjunction with driving a common mode signal and one of the communication link and detecting differential signal energy at the other end of the nutritionally). Either or both of these reciprocal and correlative applications may be performed in various embodiments as desired.

Figure 5B:
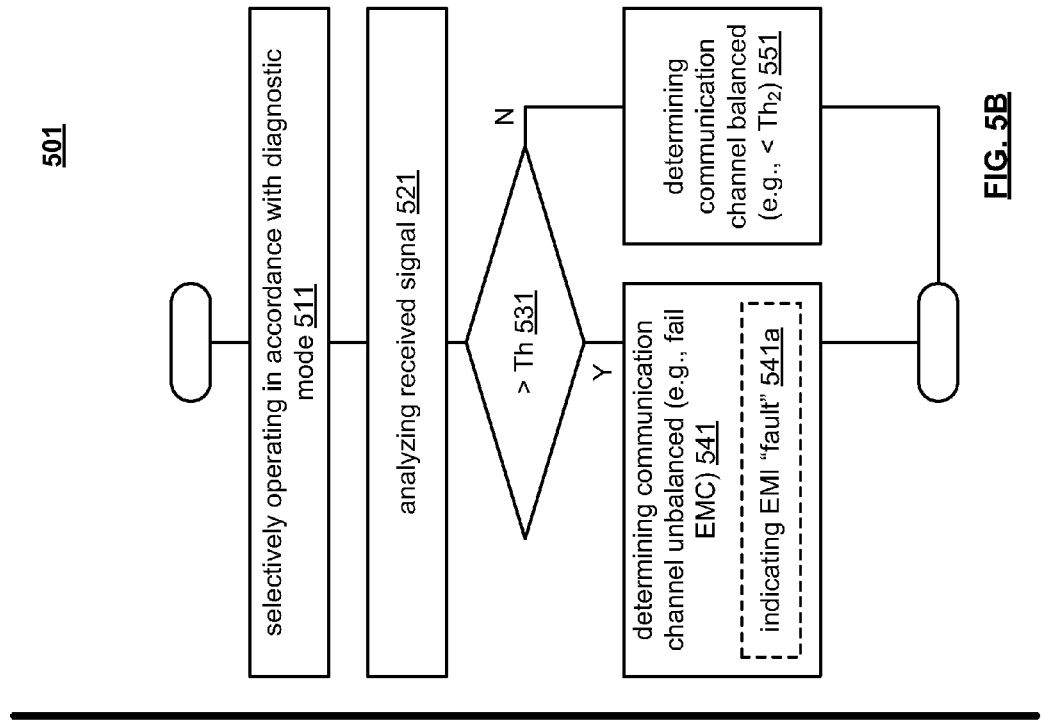
FIG. 5A and FIG. 5B illustrate various embodiments of methods for performing diagnostic operations is related to electromagnetic interference analysis.
Figure 5A:
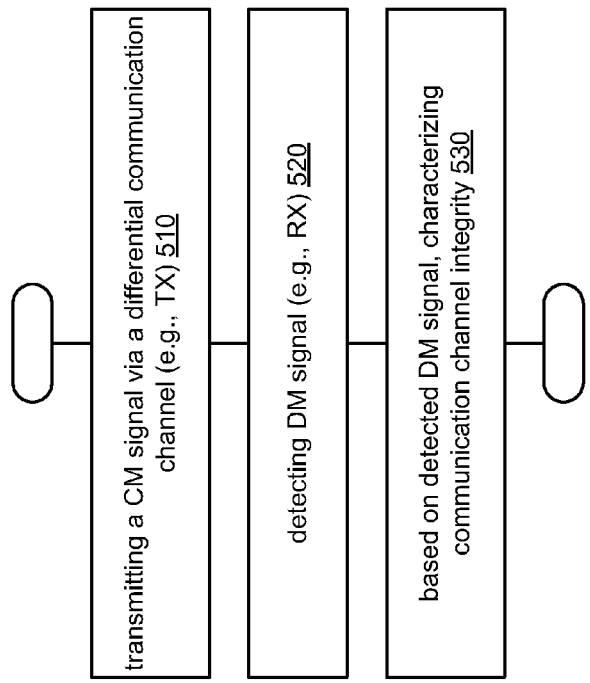

FIG. 5A and FIG. 5B illustrate various embodiments of methods 500 and 501, respectively, is for performing diagnostic operations is related to electromagnetic interference analysis.

Referring to method 500 of FIG. 5A, the method 500 begins by transmitting a common mode signal via a differential communication channel, as shown in a block 510. Such operations may be performed within a transmitter communication device at one end of the communication channel. Such a transmitter communication device may include a certain degree of circuitry and/or functionality to effectuate the transmission of a common mode signal via the differential signaling path.

The method 500 continues by detecting differential signal energy, as shown in a block 520. For example, such operation may be performed within a receiver communication device located at the opposite end of a communication link into which a common mode signal has been driven.

The method 500 then operates by characterizing the communication channel integrity based upon the detection of any differential signal energy, as shown in a block 530. Ideally, in a perfectly balanced communication channel, there will be very little, if any, detected differential signal energy. However, in the event that some differential signal energy does appear at the other end of the communication channel, this information may be employed as at least one metric in characterizing EMC performance of the communication link Referring to method 501 of FIG. 5B, the method 501 begins by selectively operating in accordance with a diagnostic mode, as shown in a block 511. That is to say, a given communication link may typically operate in accordance with a default mode such as data communications mode. However, a certain diagnostic mode may be entered into as desired (e.g., periodically, when specifically instructed, in response to one or more events, etc.) to facilitate EMC performance diagnostics testing.

The method 501 then operates by analyzing a received signal, if any signal is in fact received, as shown in a block 521. Such analyzing of a received signal may correspond to the analysis of a signal received via a communication link operating in accordance with differential signaling, and such analysis may be performed after a common mode signal has been driven into the opposite end of the communication link. The analysis of such a received signal includes identifying any differential signal energy corresponding thereto.

The method 501 continues by comparing such a received signal to at least one threshold, as shown in a block 531. In certain embodiments, the received signal and any associated differential signal energy corresponding thereto is compared to a number of thresholds. Categorization of where the differential signal energy lies among those respective thresholds may provide further information regarding a degree of EMC performance. However, in at least one embodiment, the differential signal energy is compared to a singular threshold that is used to determine whether or not the communication link is compliant to a desired degree.

When the differential signal energy is greater than the at least one threshold, the method 501 then operates by determining that the communication channel is in balanced or unbalanced, as shown in a block 541. That is to say, the communication channel may be determined to be noncompliant in accordance with EMC performance for a given application. Again, different applications may have different respective requirements in order to be EMC performance compliant.

In certain embodiments, the method 501 may operate by indicating an EMI fault, as shown in a block 541a. Such indication may be effectuated in any of a variety of ways. For example, a respective and dedicated signal may be provided to indicate such a fault, a register may be set within a given communication device, etc. Alternatively, the received signal energy, if any, may be directly reported to allow higher layers to implement more sophisticated detection schemes (e.g., such as via a register, via a direct output [pin, trace, etc.], or via some other means). For example, any of a variety of higher-level and/or post-processing operations may be performed using such received signal energy. In certain situations, various detection techniques, such as those monitoring rate of change, margin (e.g., such as with respect to one or more thresholds), absolute high and/or low levels, trends, etc. may be employed without departing from the scope and spirit of the invention. In some instances, such higher-level and/or post-processing operations may be performed within either one or more higher layers within a given device; alternatively, such operations may be performed within one or more additional devices that are in communication with the device operative for detecting and/or monitoring received signal energy. Generally speaking, any of a variety of additional higher-level and/or post-processing operations may be performed using such received signal energy for any of a variety of desired purposes as may be appropriate within various application contexts.

Alternatively, when the differential signal energy is less than the at least one additional threshold (e.g., second threshold, different than the one employed in block 531), the method 501 continues by determining that the communication channel is balanced and/or compliant in accordance with EMC performance for that particular application, as shown in a block 551. In certain embodiments, while the differential signal energy that is received may be less than that which is required to be EMC performance compliant, additional characterization of the differential signal energy may be made to provide specific information regarding the communication link (e.g., a degree of compliance in accordance with one or more protocols, standards, and or recommended practices including a degree or margin of compliance in accordance with electromagnetic compatibility (EMC) in accordance with one or more of those protocols, standards, and or recommended practices). For example, different respective measurements may be taken at different respective times to identify a trend towards non-EMC performance compliance (e.g., while the communication link may presently be compliant, by taking different measurements and comparing them over time, a trend towards degradation may be identified; such as compliant in accordance with a first degree or margin at a first time, then compliant in accordance with a second degree or margin [less than the first] at a second time, etc.). By taking different measurements at different times, information regarding a trend of operation may be made and, in some instance, an estimate may be made regarding a future expected time at which the communication link may become unbalanced and/or non-EMC performance compliant.

Of course, it is noted that, in certain embodiments, such operations as described with respect to these methods may be effectuated in both directions of the communication link.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
   a common mode circuitry configured to transmit a first common mode signal into an end of a differential communication link for transmission to an other end of the differential communication link; and
   a differential mode circuitry configured to detect differential signal energy at the end of the differential communication link when a second common mode signal is transmitted into the other end of the differential communication link and to determine a common mode to differential mode metric based on the detected differential signal energy, wherein the common mode to differential mode metric corresponds to a measure of electromagnetic compatibility (EMC) of the differential communication link.

2. The apparatus of claim 1, wherein the differential mode circuitry is further configured to:
   compare the detected differential signal energy to at least one threshold to determine compliance or noncompliance in accordance with electromagnetic compatibility.

3. The apparatus of claim 1, wherein the differential mode circuitry is further configured to:
   compare the detected differential signal energy to a threshold to determine whether the differential communication link is balanced or unbalanced.

4. The apparatus of claim 1, wherein the differential mode circuitry is further configured to:
   compare the detected differential signal energy to a threshold to determine whether the differential communication link is balanced or unbalanced; and
   compare the detected differential signal energy to at least one additional threshold, when the differential communication link is determined as being balanced, to identify a degree of EMC based on at least one protocol, standard, or recommended practice.

5. The apparatus of claim 1, wherein the differential communication link is a twisted-pair cable.

6. The apparatus of claim 1, wherein the common mode circuitry is further configured to:
transmit the first common mode signal into the end of the differential communication link when the differential mode circuitry is disabled.

7. The apparatus of claim 1, wherein:
the common mode circuitry is disabled when the differential mode circuitry is operative; and
the differential mode circuitry is disabled when the common mode circuitry is operative.

8. The apparatus of claim 1, wherein the apparatus is a communication device that is operative within at least one of a satellite communication system, a wireless communication system, a wired communication system, or a fiber-optic communication system.

9. The apparatus of claim 1, wherein the apparatus is a first communication device coupled to the end of the differential communication link, and the first common mode signal is transmitted into the other end of the differential communication link by a second communication device coupled to the other end of the differential communication link.

10. An apparatus comprising:
a communication interface configured to receive a common mode signal at an end of a differential communication link, wherein the common mode signal is transmitted via an other end the differential communication link; and
a differential mode circuitry configured to detect differential signal energy at the end of the differential communication link and to determine a common mode to differential mode metric based on the detected differential signal energy, wherein the common mode to differential mode metric corresponds to a measure of electromagnetic compatibility (EMC) of the differential communication link.

11. The apparatus of claim 10, wherein the differential mode circuitry is further configured to:
compare the detected differential signal energy to at least one threshold to determine compliance or noncompliance with electromagnetic compatibility.

12. The apparatus of claim 10, wherein the differential mode circuitry is further configured to:
compare the detected differential signal energy to a threshold to determine whether the differential communication link is balanced or unbalanced.

13. The apparatus of claim 10, wherein the differential mode circuitry is further configured to:
compare the detected differential signal energy to a threshold to determine whether the differential communication link is balanced or unbalanced; and
compare the detected differential signal energy to at least one additional threshold, when the differential communication link is determined as being balanced, to identify a degree of EMC based on at least one protocol, standard, or recommended practice.

14. The apparatus of claim 10 further comprising:
a common mode circuitry configured to transmit an other common mode signal into the differential communication link at the end of the differential communication link for transmission to the other end the differential communication link.

15. The apparatus of claim 10, wherein the differential communication link is a twisted-pair cable.

16. The apparatus of claim 10, wherein the apparatus is a communication device that is operative within at least one of a satellite communication system, a wireless communication system, a wired communication system, or a fiber-optic communication system.

17. A method comprising:
operating a common mode circuitry to transmit a first common mode signal into a an end of a differential communication link for transmission to an other end of the differential communication link;
operating a differential mode circuitry to detect differential signal energy at the end of the differential communication link when a second common mode signal is transmitted into the other end of the differential communication link;
determining a common mode to differential mode metric based on the detected differential signal energy; and
determining a measure of electromagnetic compatibility (EMC) of the differential communication link based on the common mode to differential mode metric.

18. The method of claim 17 further comprising:
comparing the detected differential signal energy to at least one threshold for determining compliance or noncompliance based on electromagnetic compatibility; and
comparing the detected differential signal energy to the at least one threshold for determining whether the differential communication link is balanced or unbalanced.

19. The method of claim 17 further comprising:
comparing the detected differential signal energy to a threshold for determining whether the differential communication link is balanced or unbalanced; and
comparing the detected differential signal energy to at least one additional threshold, when the differential communication link is determined as being balanced, for identifying a degree of EMC based on at least one protocol, standard, or recommended practice.

20. The method of claim 17, wherein the method is performed within a communication device that is operative within at least one of a satellite communication system, a wireless communication system, a wired communication system, or a fiber-optic communication system.

* * * * *